C. GMINER.
SILO.
APPLICATION FILED MAR. 17, 1909.

939,826.

Patented Nov. 9, 1909.

Witnesses

Inventor
C. Gminer.
By
Attorneys,

UNITED STATES PATENT OFFICE.

CONRAD GMINER, OF WAUPACA, WISCONSIN.

SILO.

939,826.  Specification of Letters Patent.  Patented Nov. 9, 1909.

Application filed March 17, 1909. Serial No. 483,899.

*To all whom it may concern:*

Be it known that I, CONRAD GMINER, a citizen of the United States, residing at Waupaca, in the county of Waupaca and State of Wisconsin, have invented certain new and useful Improvements in Silos, of which the following is a specification.

This invention relates to silos and has for its object to provide a cheap, durable and efficient structure in which food or vegetable matter may be stored for an extended period of time without deterioration or decay from the action of air or by the formation of mold upon the inner surface of the silo.

The invention essentially comprises the formation of two walls preferably circular in cross section, constructed of suitable material such as brick and retained in vertically spaced relation to each other by ties or headers placed upon each tier or layer of bricks and arranged to span the intervening space between the walls.

The invention also comprises the arrangement of a door in which the frame sections abutting the edges of the walls are secured by cables placed at predetermined points upon the tiers of the inner wall and fastened to the frame sections as by bolts, and sectional doors detachably secured to the frame sections and adapted to be placed in position as the space within the silo becomes filled.

For a full understanding of the invention and the merits thereof and also to acquire a knowledge of the details of construction and the means for effecting the result, reference is to be had to the following description and the drawings hereto attached.

Figure 1:
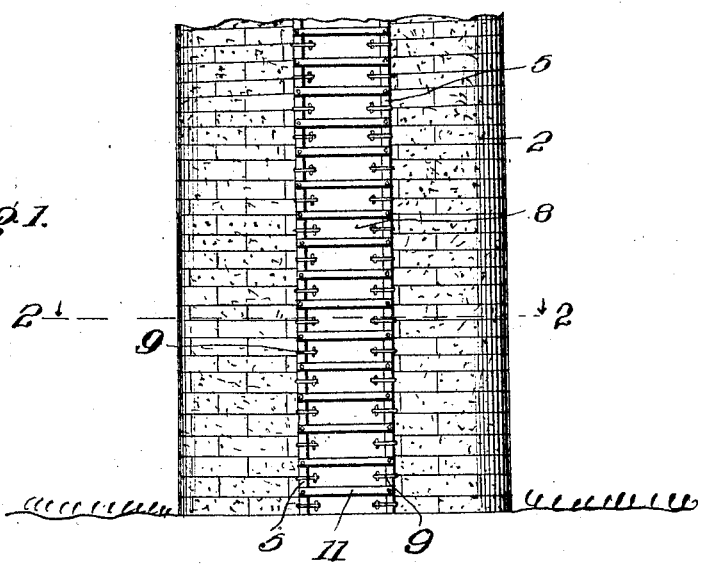
Figure 2:
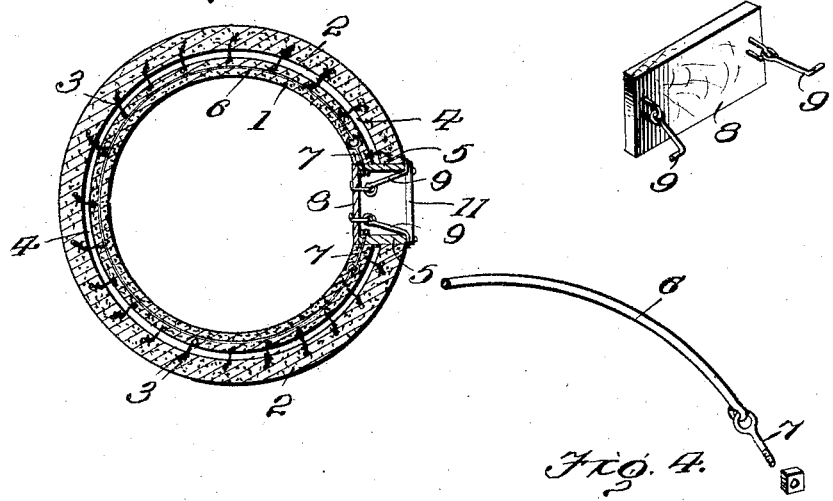
Figure 3:
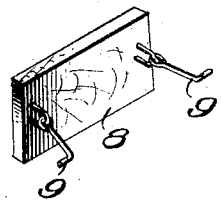
Figure 4:
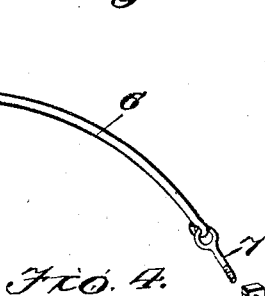

While the essential and characteristic features of the invention are necessarily susceptible of modification still the preferred embodiment of the invention is illustrated in the accompanying drawings, in which:

Figure 1 is a front elevation of the improved silo; Fig. 2 is a sectional view taken on the line 2—2 of Fig. 1; Fig. 3 is an enlarged perspective illustration of one of the door sections; and, Fig. 4 is an enlarged detail view illustrating the method of securing the door frames to the wall of the silos.

Corresponding and like parts are referred to in the following description and indicated in all the views of the drawings by the same reference characters.

Referring to the drawings the numeral 1 designates one wall of the improved silo preferably constructed of brick or other suitable material and circular in cross section. Surrounding the wall 1 and in spaced relation thereto is an exterior wall 2 corresponding in formation with the first mentioned wall and tied to said wall 1 by suitable ties or headers 3 placed upon each layer or tier of brick at intervals as illustrated in Fig. 2. These ties or headers may be short lengths of ordinary barbed wire embedded in the mortar upon each tier of bricks and arranged to span the intervening space 4 between the walls 1 and 2. By such an arrangement the uninterrupted passage of air in the space 4 between said walls is permitted and thus the penetration of moisture to the inner wall 1 and the consequent formation of mold upon the interior is prevented. The inner and outer walls are formed with vertically disposed registering doorways, and frame sections or jambs 5 are arranged at the corresponding ends of the walls and extend across the space 4 therebetween, in order to close the latter. The jambs preferably terminate short of the inner face of the inner wall 1, so that the opposing ends thereof are partially revealed, as illustrated in Fig. 2, for a purpose to be presently disclosed. The frame sections are held in place, in the present instance, by cables 6 which may be composed of any suitable number of strands, according as found necessary, and which are embedded in the mortar between predetermined tiers of bricks and are secured at their opposite ends to ring bolts 7 which pass through and engage with the respective frame sections. The cables extend entirely around the inner wall, and therefore serve to hold the frame sections securely in abutting relation to the ends of the walls and against accidental displacement.

The silo is closed by means of a plurality of superposed door sections 8 that are adapted to be fitted between the revealed end portions of the inner wall, and are designed to be held against the adjacent edges of the frame sections 5 so as to be braced against the outward pressure of the contents of the silo. In the present instance, the door sections are each provided with swinging hooks 9 that are arranged to engage the outer edges of the jambs to retain the door sections in position and admit of their ready detachment when occasion demands. The door sections are placed one upon the other in order to build up the door as the interior of the silo is filled.

For convenience, a plurality of strips 11 are secured to the outer edges of the frame sections and serve as rungs of a ladder through the instrumentality of which one may ascend to the top of the silo.

The elements of the construction most important in carrying out the present invention, are the formation of the inner and outer walls between which an air space is provided, of the method of tying the two walls together without interrupting the passage of air between said walls, and the arrangement of sectional doors detachably secured to the frame sections, the latter being anchored to the walls in a reinforced manner and adapted to withstand excessive pressure exerted upon the interior of the inner wall and upon the sectional doors.

From the foregoing description in connection with the accompanying drawings, it will be apparent that an economically constructed silo is provided, which possesses the elements of simplicity and convenience in use, and which will preserve the stored material in the desired manner.

Having thus described the invention, what is claimed as new is:—

1. A silo embodying a continuous wall and having a doorway, jambs abutting the opposing ends of the wall, an integral anchoring element embedded in the wall and positively secured at its opposite ends to the respective jambs, and means for closing the doorway.

2. A silo embodying a continuous wall constructed in tiers and provided with a vertically disposed doorway, jambs disposed at the opposing ends of the wall, a cable placed between sundry of said tiers with its opposite ends fastened to the respective jambs and anchoring the same in position, and means for closing the doorway.

In testimony whereof I affix my signature in presence of two witnesses.

CONRAD GMINER. [L. S.]

Witnesses:
 WM. DRESSEN,
 MATT. OUROM.